(12) United States Patent
Eloo et al.

(10) Patent No.: US 8,361,364 B2
(45) Date of Patent: *Jan. 29, 2013

(54) METHOD AND APPARATUS FOR MAKING CRYSTALLINE POLYMERIC PELLETS AND GRANULES

(75) Inventors: Michael Eloo, Xanten (DE); Roger B. Wright, Staunton, VA (US); Robert G. Mann, Covington, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 581 days.

This patent is subject to a terminal disclaimer.

(21) Appl. No.: 11/920,698

(22) PCT Filed: May 24, 2006

(86) PCT No.: PCT/US2006/019899
§ 371 (c)(1),
(2), (4) Date: May 30, 2008

(87) PCT Pub. No.: WO2006/127698
PCT Pub. Date: Nov. 30, 2006

(65) Prior Publication Data
US 2009/0134537 A1    May 28, 2009

Related U.S. Application Data

(60) Provisional application No. 60/684,556, filed on May 26, 2005.

(51) Int. Cl.
| B29B 9/06 | (2006.01) |
| B28B 1/08 | (2006.01) |
| D01D 5/00 | (2006.01) |
| B29C 71/02 | (2006.01) |
| B29B 9/16 | (2006.01) |

(52) U.S. Cl. .......... 264/143; 264/69; 264/142; 264/236; 264/347; 425/67; 425/68; 425/69; 425/70; 425/313

(58) Field of Classification Search .................. None
See application file for complete search history.

(56) References Cited

U.S. PATENT DOCUMENTS

| 3,544,525 | A | * | 12/1970 | Ramon et al. .................. 528/483 |
| 3,988,085 | A | * | 10/1976 | Krchma .......................... 425/71 |
| 4,064,112 | A | | 12/1977 | Rothe et al. |
| 4,161,578 | A | | 7/1979 | Herron |
| 4,476,019 | A | | 10/1984 | Nowisch et al. |
| 4,632,752 | A | * | 12/1986 | Hunke .......................... 210/173 |
| 5,290,913 | A | * | 3/1994 | McAllister et al. ........... 528/483 |
| 5,412,063 | A | | 5/1995 | Duh et al. |
| 5,532,335 | A | | 7/1996 | Kimball et al. |
| 5,563,209 | A | | 10/1996 | Schumann et al. |
| 5,607,700 | A | * | 3/1997 | Kando et al. .................... 425/71 |
| 5,609,892 | A | | 3/1997 | Garcia et al. |

(Continued)

*Primary Examiner* — Jeffrey Wollschlager
(74) *Attorney, Agent, or Firm* — Jacobson Holman, PLLC

(57) ABSTRACT

A method and apparatus for underwater pelletizing and subsequent drying of crystallizing polymers to crystallize the polymer pellets without subsequent heating is shown in FIG. 5. High velocity air or other inert gas is injected into the water and pellet slurry line (120) toward the dryer near the pelletizer exit (102) at a flow rate of from about 100 to about 175 m³/hour, or more. Such high-speed air movement forms a vapor mist with the water and significantly increases the speed of the pellets into and out of the dryer such that the polymer pellets leave the dryer with sufficient latent heat to cause self-crystallization within the pellets. A valve mechanism in the slurry line (150) after the gas injection further regulates the pellet residence time and a vibrating conveyor after the dryer helps the pellets to achieve the desired level of crystallinity and to avoid agglomeration.

24 Claims, 7 Drawing Sheets

U.S. PATENT DOCUMENTS

| | | | |
|---|---|---|---|
| 5,633,018 A | 5/1997 | Stouffer et al. | |
| 5,648,032 A | 7/1997 | Nelson et al. | |
| 5,663,281 A | 9/1997 | Brugel | |
| 5,708,124 A | 1/1998 | Al Ghatta et al. | |
| 5,714,571 A | 2/1998 | Al Ghatta et al. | |
| 5,744,571 A | 4/1998 | Hilbert et al. | |
| 5,744,572 A | 4/1998 | Schumann et al. | |
| 5,750,644 A | 5/1998 | Duh | |
| 5,830,981 A | 11/1998 | Koreishi et al. | |
| 5,864,001 A | 1/1999 | Masse et al. | |
| 5,895,617 A * | 4/1999 | Mizuguchi et al. | 264/141 |
| 6,113,997 A | 9/2000 | Massey et al. | |
| 6,121,410 A | 9/2000 | Gruber et al. | |
| 6,159,406 A | 12/2000 | Shelby et al. | |
| 6,277,951 B1 | 8/2001 | Gruber et al. | |
| 6,344,539 B1 | 2/2002 | Palmer | |
| 6,358,578 B1 | 3/2002 | Otto et al. | |
| 6,403,762 B1 | 6/2002 | Duh | |
| 6,455,664 B1 | 9/2002 | Patel et al. | |
| 6,518,391 B1 | 2/2003 | McCloskey et al. | |
| 6,534,617 B1 | 3/2003 | Batt et al. | |
| 6,538,075 B1 | 3/2003 | Krech et al. | |
| 6,706,824 B1 | 3/2004 | Pfaendner et al. | |
| 6,740,377 B2 | 5/2004 | Pecorini et al. | |
| 6,762,275 B1 | 7/2004 | Rule et al. | |
| 6,790,499 B2 | 9/2004 | Andrews et al. | |
| 7,157,032 B2 * | 1/2007 | Eloo | 264/143 |
| 7,204,945 B2 * | 4/2007 | Bonner | 264/143 |
| 7,250,486 B1 * | 7/2007 | McGehee | 528/308 |
| 2005/0049391 A1 | 3/2005 | Rule et al. | |
| 2005/0056961 A1 * | 3/2005 | Bonner | 264/143 |
| 2005/0062186 A1 * | 3/2005 | Fellinger | 264/102 |
| 2005/0085620 A1 * | 4/2005 | Bruckmann | 528/480 |
| 2005/0110181 A1 | 5/2005 | Ingwersen et al. | |
| 2005/0110182 A1 * | 5/2005 | Eloo | 264/69 |
| 2005/0110184 A1 * | 5/2005 | Eloo | 264/143 |
| 2005/0154183 A1 | 7/2005 | Ekart et al. | |

* cited by examiner

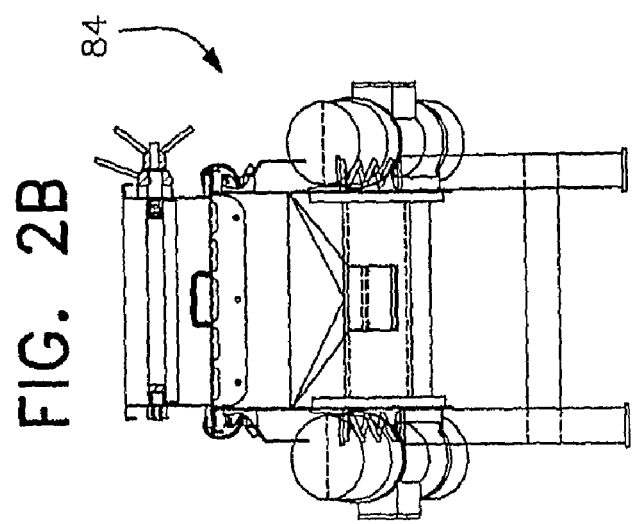
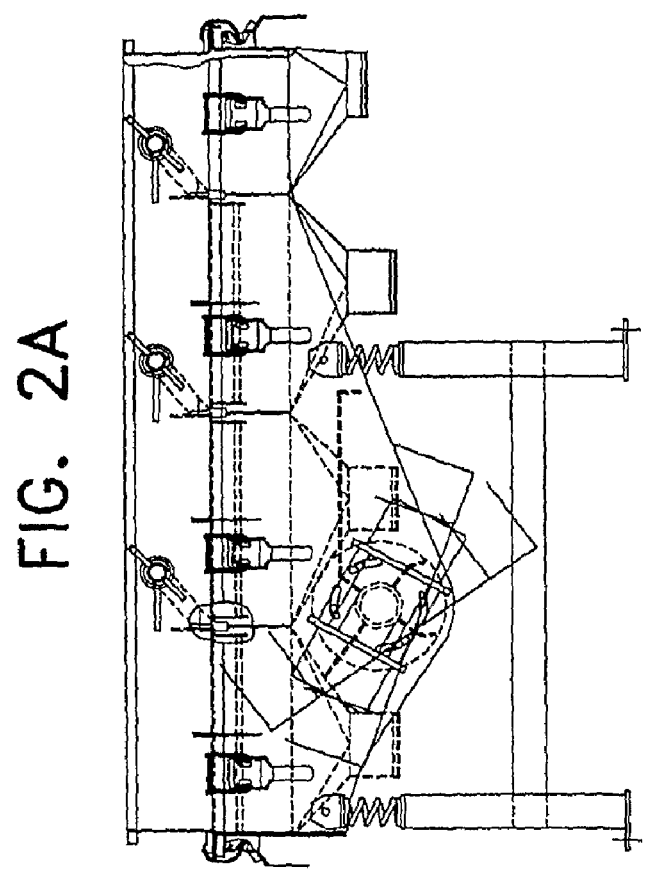

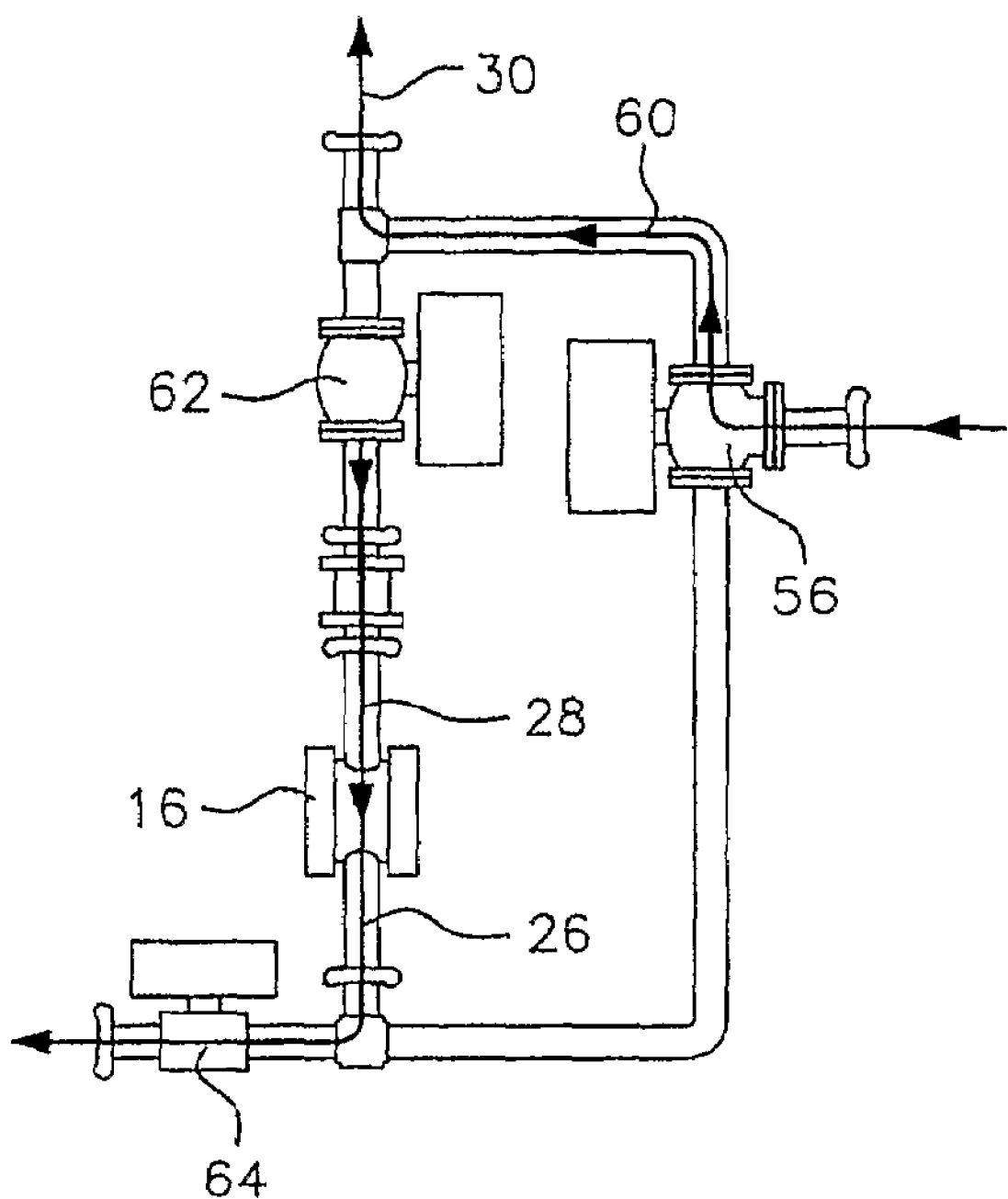

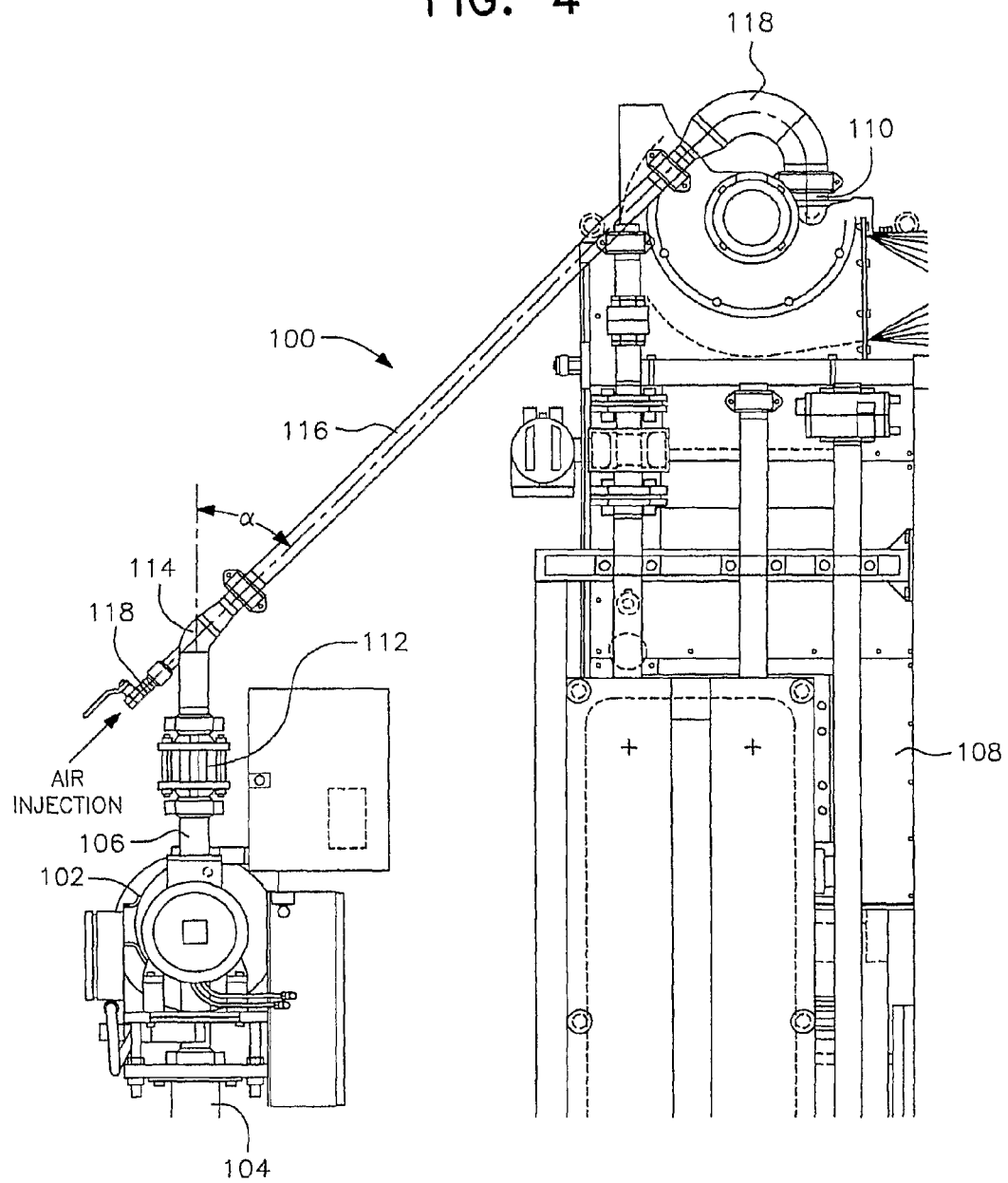

METHOD AND APPARATUS FOR MAKING CRYSTALLINE POLYMERIC PELLETS AND GRANULES

RELATED APPLICATION

This is a national stage of PCT/US06/019899 filed May 24, 2006 and published in English, which claims the priority of U.S. provisional application Ser. No. 60/684,556, filed May 26, 2005.

FIELD OF THE INVENTION

The present invention generally relates to a method and apparatus for underwater pelletizing and subsequent drying of polymer pellets with an increased level of crystallinity. More specifically, the present invention relates to a method and apparatus for pelletizing polyesters, polyamides, polycarbonates, thermoplastic polyurethanes, and their respective copolymers, underwater with subsequent drying of those pellets and granules in a manner such that crystallization of those pellets or granules is self-initiated. The pelletization and drying process described herein produces pellets and granules having a desired level of crystallinity rather than an amorphous structure.

The present invention expands upon the disclosures of pending U.S. application Ser. Nos. 10/717,630 and 10/954,349, filed Nov. 21, 2003 and Oct. 1, 2004, respectively, which are owned by Gala Industries, Inc. of Eagle Rock, Va. (hereinafter Gala), the assignee of the present invention and application. The disclosures of the aforesaid pending U.S. applications are expressly incorporated in this application by reference as if fully set forth herein and the aforesaid applications are hereinafter referred to as "the Gala applications".

BACKGROUND OF THE INVENTION

The following U.S. patents and published patent applications include disclosures which may be relevant to the present invention and are expressly incorporated by reference in this application as if fully set forth herein:

| Number | Inventors |
| --- | --- |
| 5,563,209 | Schumann et al |
| 6,706,824 | Pfaendner et al |
| 5,648,032 | Nelson et al |
| 6,762,275 | Rule et al |
| 6,790,499 | Andrews et al |
| 6,344,539 | Palmer |
| 6,518,391 | McCloskey et al |
| 5,663,281 | Brugel |
| 6,455,664 | Patel et al |
| 6,740,377 | Pecorini et al |
| 5,750,644 | Duh |
| 6,121,410 | Gruber et al |
| 6,277,951 | Gruber et al |
| 4,064,112 | Rothe et al |
| 4,161,578 | Herron |
| 5,412,063 | Duh et al |
| 5,532,335 | Kimball et al |
| 5,708,124 | Al Ghatta et al |
| 5,714,571 | Al Ghatta et al |
| 5,744,571 | Hilbert et al |
| 5,744,572 | Schumann et al |
| 6,113,997 | Massey et al |
| 6,159,406 | Shelby et al |
| 6,358,578 | Otto et al |
| 6,403,762 | Duh |
| 5,864,001 | Masse et al |
| 6,534,617 | Batt et al |
| 6,538,075 | Krech et al |
| 2005/0049391 | Rule et al |
| 2005/0056961 | Bonner |

SUMMARY OF THE INVENTION

The present invention is directed to a pelletizing system that produces polymeric pellets underwater that retain sufficient latent heat to self-initiate the crystallization process and ultimately provide sufficient crystalline structure without requirement for an additional heating step for the polymeric pellets and granules prior to additional processing. The Gala applications have demonstrated the effectiveness of this elevated heat condition on poly(ethylene terephthalate) or PET and copolymers made therefrom. It has been discovered that other polymers which can be crystallized when subjected to analogous elevated heat conditions benefit from the reduction of the residence time of the pellets and granules in the water slurry, leaving sufficient heat in the pellets and granules during the drying stage to allow crystallization to initiate within the pellets and granules. These polymers fall into the broad category of polymers identified herein as "crystallizing polymers".

To accomplish the self-initiated crystallization, it has been found that the pellets must be separated from the water as quickly as possible with significant increase in the speed with which they flow from the exit of the underwater pelletizer and into and through the drying apparatus. Such pellets exit the dryer retaining much of their latent heat and can be transported on conventional vibrating conveyors or similar vibratory or other handling equipment such that with the additional time the desired crystallinity is achieved. Storage of the hot pellets in conventional heat retaining containers or heat insulating containers is included in the instant invention that provide time to complete the desired level of crystallization. The desired crystallization is at least sufficient to avoid agglomeration of the pellets and granules when subjected to additional processing.

The separation of the pellets and granules from the water and subsequent increase of the pellet speed to the drying apparatus is accomplished in accordance with the same general procedures and apparatus disclosed for PET and copolymers in the Gala applications. Once the cut pellets and granules leave the underwater pelletizer water box in the water slurry, air or other suitable inert gas is injected into the transport pipe leading from the water box to the drying apparatus. The injected air serves to aspirate the water into vapor effectively separating it from the pellets and granules and further increases the speed of transport of the pellets to and ultimately through the dryer. This increase in transport speed is sufficiently rapid to allow the pellet to remain at a temperature hot enough to initiate the crystallization process inside the pellets and granules which may be amorphous upon exiting the centrifugal dryer. Other conventional methods of drying the pellet with comparable efficiency may be employed by one skilled in the art and are included herein by reference.

To achieve aspiration of the water and increase the transport speed from the exit of the pelletizer waterbox to the dryer, the air injected must be at a very high velocity. In particular, the volume of the injected air should preferably be at least 100 cubic meters per hour based on injection through a valve into a 1.5 inch diameter pipe. This flow volume will vary in accordance with throughput volume, drying efficiency, and pipe diameter as will be understood by one skilled in the art. Nitrogen or other inert gas may be used instead of air. Other methods providing comparable separation of the liquid water from the pellets with acceleration of the pellet to and through the dryer may be employed by one skilled in the art and are included herein by reference.

The rate of the air injection into the slurry piping is preferably regulated through use of a ball valve or other valve mechanism located after the air injection point. Regulation through this valve mechanism allows more control of the residence time for the pellets and granules in the transport pipe and drying apparatus and serves to improve the aspiration of the pellet/water slurry. Vibration is reduced or eliminated in the transport pipe by use of the valve mechanism after the air injection point as well.

Regulation of the air injection provides the necessary control to reduce the transport time from the exit of the pelletizer waterbox through the dryer allowing the pellets to retain significant latent heat inside the pellets. Larger diameter pellets do not lose the heat as quickly as do smaller diameter pellets and therefore can be transported at lower velocity than the smaller pellets. Comparable results are achieved by increasing the air injection velocity as pellet diameter decreases as will be understood by one skilled in the art. Reduction of the residence time between the pelletizer waterbox and the dryer exit leaves sufficient heat in the pellets to achieve the desired crystallization. The retention of heat inside the pellet is enhanced through use of a heat-retaining vibrating conveyor following pellet release from the dryer and/or through the use of conventional storage containers or heat insulating containers.

Transportation times on the vibrating conveyor are disclosed in the Gala applications to be effective from 20 to 90 seconds, and have been found to be particularly effective from 30 to 60 seconds. This time frame should be effective for the polymers herein described. Crystallization of 30% or greater, preferably 35% or greater, and most preferably 40% or greater, may be achieved by the process described herein. Variation of the residence times for polymer and polymer blends may be adjusted as needed to optimize results for the particular formulation and desired level of crystallinity as will be understood by one skilled in the art. Additional heating steps are eliminated through use of the process described herein.

Accordingly, it is an object of the present invention to provide a method and apparatus for processing crystallizing polymers in an underwater pelletizing system which can produce crystallization in the polymer pellets that exit from the dryer.

It is another object of the present invention to provide a method and apparatus for producing crystallization in crystallizing polymer pellets utilizing an underwater pelletizing system without the necessity of an expensive secondary heating stage to convert amorphous polymer pellets to crystalline polymer pellets.

It is a further object of the present invention to provide a method and apparatus for the underwater pelletizing of crystallizing polymers in which an inert gas is injected into the water and pellet slurry exiting the pelletizer to produce a water vapor mist form of slurry handling, thereby providing better heat retention in the transported pellets.

A still further object of the present invention is to provide a method and apparatus for underwater pelletizing of crystallizing polymers in accordance with the preceding object in which the pellets are rapidly transported through the equipment through the injection of air at a flow rate of at least 100 m$^3$/hour, to about 175 m$^3$/hour or more, so that the residence time of the pellets before exiting the dryer is sufficiently reduced to generate crystallization on the order of 30%-40% of total (100%) crystallization.

It is yet another object of the present invention to provide a method and apparatus for producing crystallizing polymer pellets using an underwater pelletizing system in which the pellets exiting the dryer have sufficient heat remaining inside the pellets for at least 35% total crystallization of the pellets to occur without subsequent heating.

It is still a further object of the present invention to provide an underwater pelletizing method and apparatus for producing crystallizing polymer pellets in which the residence time of the pellets from the time of extrusion at the die face until exit from the centrifugal dryer is reduced to less than about one second by gas injection into the slurry line from the pelletizer to the dryer.

A still further object of the present invention is to provide an underwater pelletizing method and apparatus for producing crystallizing polymer pellets in accordance with the preceding object in which the residence time is regulated using a valve mechanism for improved pressurization of the water vapor mist downstream of the valve in the slurry line.

It is another object of the present invention to provide an underwater pelletizing system in which the hot pellets exiting the dryer are carried on a vibrating conveyor or other vibrating or handling equipment to achieve virtually uniform crystallization throughout a given output pellet volume.

Yet a further object of the present invention is to expand the scope of the polymers and copolymers for which the apparatus and method of the Gala applications can achieve polymer self-initiated crystallization.

These together with other objects and advantages which will become subsequently apparent reside in the details of construction and operation of the invention as more fully hereinafter described and claimed, reference being had to the accompanying drawings forming a part hereof, wherein like numerals refer to like parts throughout.

BRIEF DESCRIPTION OF THE DRAWINGS

FIG. 2*a* is a schematic illustration of the side view of the vibrating conveyor of FIG. 1.

FIG. 2*b* is a schematic illustration of the end view of the vibrating conveyor of FIG. 1.

FIG. 3 illustrates the components of the underwater pelletizing system shown in FIG. 1 during a bypass mode when the process line has been shut down.

FIG. 4 is a schematic illustration showing the method and apparatus for air or other inert gas injection into the slurry line from the pelletizer to the dryer in accordance with the present invention.

DETAILED DESCRIPTION OF THE PREFERRED EMBODIMENTS

Figure 1:
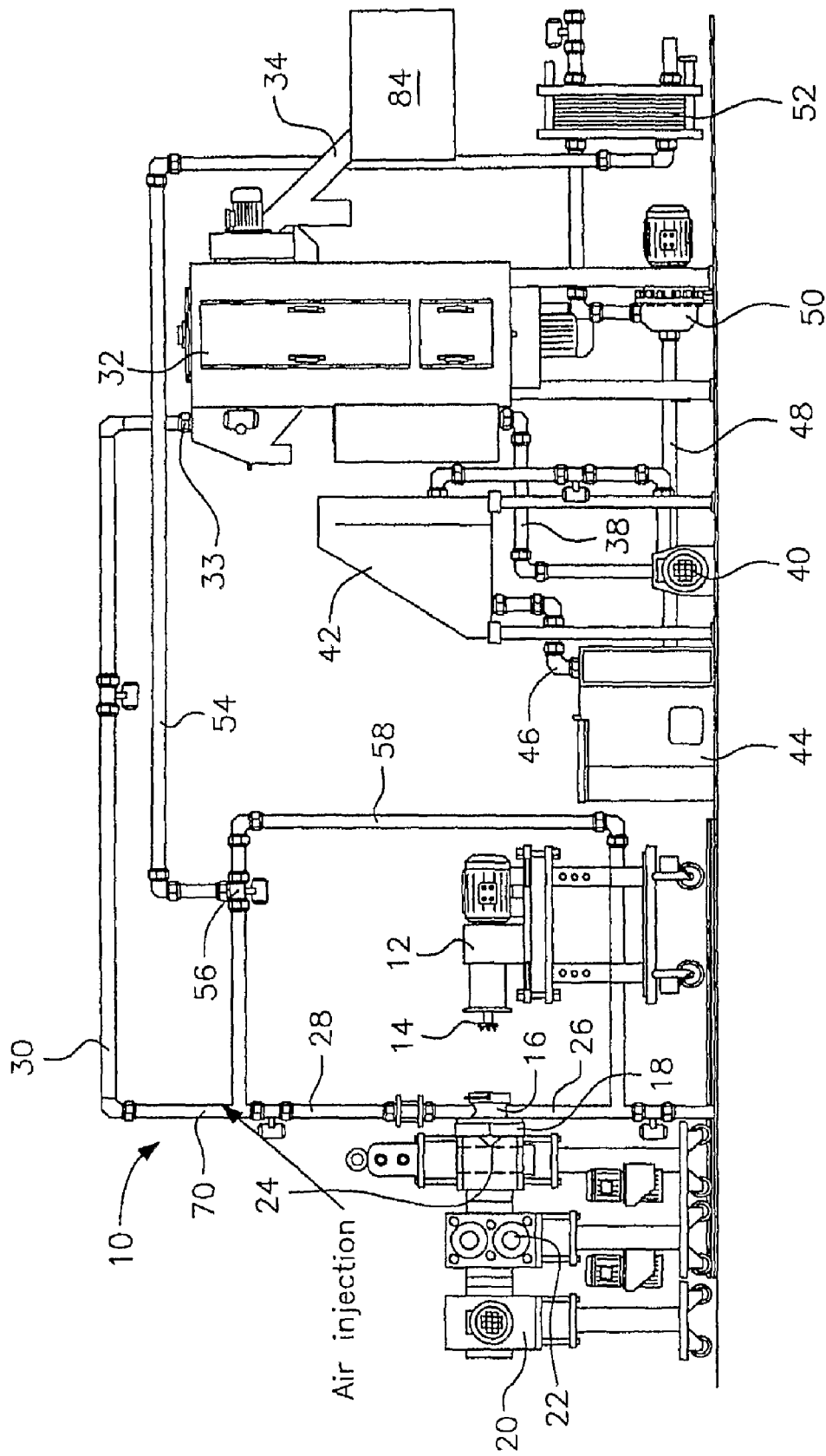
FIG. 1 is a schematic illustration of an underwater pelletizing system, including an underwater pelletizer and centrifugal dryer manufactured and sold by Gala with air injection and vibrating conveyor in accordance with the present invention.

Preferred embodiments of the invention are explained in detail. It is to be understood that the invention is not limited in its scope to the details of construction, arrangement of the components, or chemical components set forth in the description which follows or as illustrated in the drawings. The embodiments of the invention are capable of being practiced or carried out in various ways and are contained within the scope of the invention.

Descriptions of the embodiments which follow utilize terminology included for clarification and are intended to be understood in the broadest meaning including all technical equivalents by those skilled in the art. The polymer components set forth in this invention provide those of ordinary skill in the art with detail as to the breadth of the method as disclosed and is not intended to limit the scope of the invention.

Polyesters which qualify as crystallizing polymers for the present invention are of the general structural formula $(OR_1O)_x[(C=O)R_2(C=O)]_y$ and/or $[(C=O)R_1O]_x[(C=O)R_2O]_y$. $R_1$ and $R_2$ herein described include aliphatic, cycloaliphatic, aromatic and pendant substituted moieties including but not limited to halogens, nitro functionalities, alkyl and aryl groups, and can be the same or different. More preferably, polyesters herein described include poly(ethylene terephthalate) or PET, poly(trimethylene terephthalate) or PTT, poly(butylene terephthalate) or PBT, poly(ethylene naphthalate) or PEN, polylactide or PLA, and poly(alpha-hydroxyalkanoates) or PHA.

Polyamides which qualify as crystallizing polymers for the present invention are of the general structural formula $[N(H,R)R_1N(H,R)]_x[(C=O)R_2(C=O)]_y$ and/or $[(C=O)R_1N(H,R)]_x[(C=O)R_2N(H,R)]_y$. $R_1$ and $R_2$ herein described include aliphatic, cycloaliphatic, aromatic and pendant substituted moieties including but not limited to halogens, nitro functionalities, alkyl and aryl groups and can be the same or different. R herein described includes but is not limited to aliphatic, cycloaliphatic, and aromatic moieties. More preferably, polyamides include polytetramethylene adipamide or nylon 4,6, polyhexamethylene adipamide or nylon 6,6, polyhexamethylene sebacamide or nylon 6,10, poly(hexamethylenediamine-co-dodecanedioic acid) or nylon 6,12, polycaprolactam or nylon 6, polyheptanolactam or nylon 7, polyundecanolactam or nylon 11, and polydodecanolactam or nylon 12.

Polycarbonates which qualify as crystallizing polymers for the present invention are of the general structural formula $[(C=O)OR_1O]_x$. $[(C=O)OR_2O]_y$. $R_1$ and $R_2$ herein described include aliphatic, cycloaliphatic, aromatic and pendant substituted moieties including but not limited to halogens, nitro functionalities, alkyl and aryl groups and can be the same or different. More preferably, polycarbonates include bisphenol and substituted bisphenol carbonates where bisphenol is of the structural formula $HOPhC(CH_3)_2PhOH$ or $HOPhC(CH_3)(CH_2CH_3)PhOH$ where Ph describes the phenyl ring and substituents include but are not limited to alkyl, cycloalkyl, aryl, halogen, and nitro functionalities.

Polyurethanes which qualify as crystallizing polymers for the present invention are of the general structural formula $[(C=O)OR_1N(H,R)]_x[(C=O)OR_2N(H,R)]_y$. $R_1$ and $R_2$ herein described include aliphatic, cycloaliphatic, aromatic and pendant substituted moieties including but not limited to halogens, nitro functionalities, alkyl and aryl groups and can be the same or different. R herein described includes but is not limited to aliphatic, cycloaliphatic, and aromatic moieties. More preferably, polyurethanes include polyether polyurethane and/or polyester polyurethane copolymers including methylenebis (phenylisocyanate).

Additional polyesters and copolymers not previously disclosed, polyamides and copolymers, polycarbonates and copolymers, and polyurethanes and copolymers which qualify as crystallizing polymers for the present invention may be comprised of at least one diol including ethylene glycol, 1,2-propylene glycol, 1,3-propylene glycol, 1,3-butanediol, 1,4-butanediol, 1,5-pentanediol, 1,3-hexanediol, 1,6-hexanediol, neopentyl glycol, decamethylene glycol, dodecamethylene glycol, 2-butyl-1,3-propanediol, 2,2-dimethyl-1,3-propanediol, 2,2-diethyl-1,3-propanediol, 2-ethyl-2-isobutyl-1,3-propanediol, 2-methyl-1,4-pentanediol, 3-methyl-2,4-pentanediol, 3-methyl-1,5-pentanediol, 2,2,4-trimethyl-1,3-pentanediol, 2-ethyl-1,3-hexanediol, 2,2,4-trimethyl-1,6-hexanediol, 1,2-cyclohexanediol, 1,4-cyclohexanediol, 1,2-cyclohexane dimethanol, 1,3-cyclohexane dimethanol, 1,4-cyclohexane dimethanol, diethylene glycol, triethylene glycol, polyethylene glycol, dipropylene glycol, tripropylene glycol, polypropylene glycol, polytetramethylene glycol, catechol, hydroquinone, isosorbide, 1,4-bis (hydroxymethyl)-benzene, 1,4-bis(hydroxyethoxy)benzene, 2,2-bis(4-hydroxyphenyl)propane and isomers thereof.

Other polyesters and copolymers, polyamides and copolymers, polycarbonates and copolymers, and polyurethanes and copolymers which qualify as crystallizing polymers for the present invention may be comprised of at least one lactone or hydroxyacid including butyrolactone, caprolactone, lactic acid, glycolic acid, 2-hydroxyethoxyacetic acid, 3-hydroxypropoxy-acetic acid, and 3-hydroxybutyric acid.

Still other polyesters and copolymers, polyamides and copolymers, polycarbonates and copolymers, and polyurethanes and copolymers which qualify as crystallizing polymers for the present invention may be comprised of at least one diacid including phthalic acid, isophthalic acid, terephthalic acid, naphthalene-2,6-dicarboxylic acid and isomers, stilbene dicarboxylic acid, 1,3-cyclohexanedicarboxylic acid, diphenyldicarboxylic acids, succinic acid, glutaric acid, adipic acid, azelaic acid, sebacic acid, fumaric acid, pimelic acid, undecanedioic acid, octadecanedioic acid, and cyclohexanediacetic acid.

Further polyesters and copolymers, polyamides and copolymers, polycarbonates and copolymers, and polyurethanes and copolymers which qualify as crystallizing polymers for the present invention may be comprised of at least one diester including dimethyl or diethyl phthalate, dimethyl or diethyl isophthalate, dimethyl or diethyl terephthalate, dimethyl naphthalene-2,6-dicarboxylate and isomers.

Yet other polyamides and copolymers, polyesters and copolymers, polycarbonates and copolymers, and polyurethanes and copolymers which qualify as crystallizing polymers for the present invention may be comprised of diamines including 1,3-propanediamine, 1,4-butanediamine, 1,5-pentanediamine, 1,6-hexanediamine, 1,8-octanediamine, 1,10-decanediamine, 1,12-dodcanediamine, 1,16-hexadecanediamine, phenylenediamine, 4,4'-diaminodiphenylether, 4,4'-diaminodiphenylmethane, 2,2-dimethy 1,5-pentanediamine, 2,2,4-trimethyl-1,5-pentanediamine, and 2,2,4-trimethyl-1,6-hexanediamine.

Still further polyamides and copolymers, polyesters and copolymers, polycarbonates and copolymers, and polyurethanes and copolymers which qualify as crystallizing polymers for the present invention may be comprised of at least one lactam or amino acid including propiolactam, pyrrolidinone, caprolactam, heptanolactam, caprylactam, nonanolactam, decanolactam, undecanolactam and dodecanolactam.

And other polyurethanes and copolymers, polyesters and copolymers, polyamides and copolymers, and polycarbonates and copolymers which qualify as crystallizing polymers for the present invention may be comprised of at least one isocyanate including 4,4'-diphenylmethane diisocyanate and isomers, toluene diisocyanate, isophorone diisocyanate, hexamethylene-diisocyanate, ethylene diisocyanate, 4,4'-methylenebis (phenylisocyanate) and isomers, xylylene diisocyanate and isomers, tetramethyl xylylene diisocyanate, 1,5-naphthalene-diisocyanate, 1,4-cyclohexyl diisocyanate, diphenylmethane-3,3'-dimethoxy-4,4'-diisocyanate, 1,6-hexanediisocyanate, 1,6-diisocyanato-2,2,4,4-tetramethyl-hexane, 1,3-bis (isocyanatomethyl)cyclohexane, and 1,10-decanediisocyanate.

An underwater pelletizing system for use in connection with the present invention is shown schematically in FIG. 1. The underwater pelletizing system is designated generally by reference number 10 and includes an underwater pelletizer 12, such as a Gala underwater pelletizer, with cutter hub and blades 14 exposed in the separated view from the waterbox 16 and die plate 18.

In the underwater pelletizing system 10, the polymers to be processed are fed from above using a polymer vat or hopper 160 (see FIG. 6) typically into an extruder 155 and undergoes shear and heat to melt the polymer. Polyesters and polyamides are typically extruded from about 200° C. to about 300° C. Hot melt adhesive formulations are typically extruded from about 100° C. to about 200° C. Polycarbonates are typically extruded from about 225° C. to about 350° C. and polyurethanes typically are extruded from about 175° C. to about 300° C. The polymer melt is fed into the screen changer 20 (see FIG. 1) to remove any solid particles or extraneous material. The melt continues to feed through the gear pump 22 which provides a smooth and controlled flow rate into the polymer diverter valve 24 and into the die holes in the die plate 18. The strands of polymer melt formed by extrusion through the die holes enter into the waterbox 16 and are cut by the rotating cutter hub and blades 14 to form the desired pellets or granules. This process as described herein is exemplary in nature and other configurations achieving the desired polymer flow as are readily understood by someone skilled in the art and/or as otherwise defined in accordance with prior art are included within the scope of the invention.

Prior art has demonstrated the numerous modifications and additives to the extrusion process which are useful in reducing the degradation of the extrudate thermally or oxidatively. Among these adaptations are included vacuum removal of byproducts and excess monomers, hydrolysis reduction, control of catalytic depolymerization, inhibition of polymerization catalysts, end-group protection, molecular weight enhancement, polymer chain extension, and use of inert gas purges.

Water enters the waterbox 16 through pipe 26 and rapidly removes the pellets so formed from the die face to form a pellet and water slurry. The process water circulated through the pelletizer waterbox as included in this invention is not limited herein and may contain additives, cosolvents, and processing aids as needed to facilitate pelletization, prevent agglomeration, and/or maintain transport flow as will be understood by those skilled in the art. The pellet water slurry so formed exits the waterbox through pipe 28 and is conveyed toward the dryer 32 through slurry line 30.

The water and pellet slurry is then conveyed through the slurry line 30 into a dryer 32, such as a Gala centrifugal dryer, at inlet 33. The pellets are dried in the dryer 32 and exit the dryer at 34. The water removed from the dried pellets exits the dryer 32 through pipe 38 and is conveyed by pump 40 into a fines removal sieve 42 and thence into a water tank 44 through pipe 46. The recycled water leaves water tank 44 through pipe 48 and pump 50 into a water heat exchanger 52 to reduce the water temperature. The cooled water is recycled through pipe 54 past bypass valve 56 and pipe 58 to inlet pipe 26 and then into the water box 16.

In accordance with this invention, air is injected into the system slurry line 30 at point 70, preferably adjacent to the exit from the waterbox 16 and near the beginning of the slurry line 30. As is clear from FIG. 1, the air is infected into the slurry line at a point before water is removed from the slurry. The preferred site 70 for air injection facilitates the transport of the pellets by increasing the transport rate and facilitating the aspiration of the water in the slurry, thus allowing the pellets and granules to retain sufficient latent heat to effect the desired crystallization. High velocity air is conveniently and economically injected into the slurry line 30 at point 70 using conventional compressed air lines typically available at manufacturing facilities, such as with a pneumatic compressor. Other inert gas including but not limited to nitrogen in accordance with this invention may be used to convey the pellets at a high velocity as described. This high velocity air or inert gas flow is achieved using the compressed gas producing a volume of flow of at least 100 meters$^3$/hour using a standard ball valve for regulation of a pressure of at least 8 bar into the slurry line 30 which is standard pipe diameter, preferably 1.5 inch pipe diameter.

To those skilled in the art, flow rates and pipe diameters can vary according to the throughput volume, level of crystallinity desired, and the size of the pellets and granules. The high velocity air or inert gas effectively contacts the pellet water slurry generating water vapor by aspiration, and disperses the pellets throughout the slurry line propagating those pellets at increased velocity into the dryer 32, preferably at a rate of less than one second from the waterbox 16 to the dryer exit 34. The high velocity aspiration produces a mixture of pellets in an air/gas mixture which may approach 98-99% by volume of air in the gaseous mixture.

Figure 5:
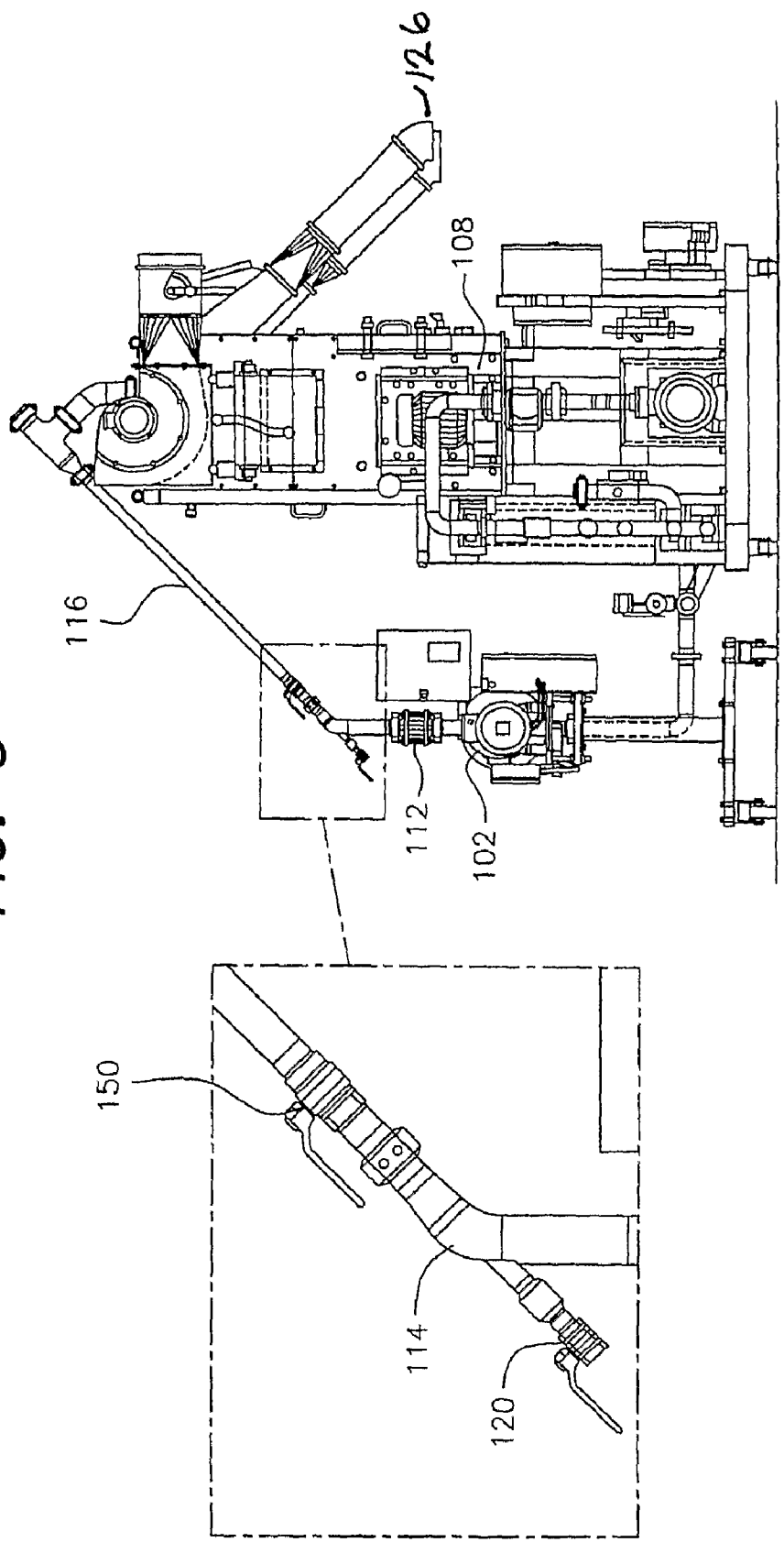
FIG. 5 is a schematic illustration showing a preferred method and apparatus for inert gas injection into the slurry line from the pelletizer to the dryer including an expanded view of the ball valve in the slurry line.

FIG. 5 shows a preferred arrangement for air injection into the slurry line. The water/pellet slurry exits the pelletizer waterbox 102 into the slurry line 106 (FIG. 4) through the sight glass 112 past the angle elbow 114 where the compressed air is injected from the valve 120 through the angled slurry line 116 and past the enlarged elbow 118 through the dryer entrance 110 and into the dryer 108. It is preferred that the air injection into the angled elbow 114 is in line with the axis of the slurry line 116 providing the maximum effect of that air injection on the pellet/water slurry resulting in constant aspiration of the mixture.

The angle formed between the vertical axis of slurry line 116 and the longitudinal axis of said slurry line 116 can vary from 0° to 90° or more as required by the variance in the height of the pelletizer 102 relative to the height of the entrance 110 to the dryer 108. This difference in height may be due to the physical positioning of the dryer 108 in relation to the pelletizer 102 or may be a consequence of the difference in the sizes of the dryer and pelletizer. The preferred angle range is from 30° to 60° with the more preferred angle being 45°. The enlarged elbow 118 into the dryer entrance 110 facilitates the transition of the high velocity aspirated pellet/water slurry from the incoming slurry line 116 into the entrance of the dryer 110 and reduces the velocity of the pellet slurry into the dryer 108.

The preferred position of the equipment, as shown in FIG. 5, allows transport of the pellets from the pelletizer 102 to the exit of the dryer 108 in approximately one second which minimizes loss of heat inside the pellet. This is further optimized by insertion of a second valve mechanism, or more preferred a second ball valve 150, after the air injection port 120. This additional ball valve allows better regulation of the residence time of the pellets in the slurry line 116 and reduces any vibration that may occur in the slurry line. The second ball valve allows additional pressurization of the air injected into the chamber and improves the aspiration of the water from the pellet/water slurry. This becomes especially important as the size of the pellets and granules decrease in size.

The pellets are ejected through the exit 126 of the dryer 108 and are preferably directed toward a vibratory unit, such as a vibrating conveyor 84 illustrated schematically in FIGS. 2a and 2b. The agitation which results from the vibratory action of the vibrating conveyor 84 allows heat to be transferred between the pellets as they come in contact with other pellets and the components of the vibrating conveyor. This promotes better uniformity of temperature and results in improved and more uniform crystallinity of those pellets and granules. Agitation alleviates the tendency for pellets to adhere to each other and/or to the components of the vibrating conveyor as a consequence of the increased pellet temperature.

The residence time of the pellets and granules on the vibrating conveyor contributes to the desired degree of crystallization to be achieved. The larger the pellet the longer the residence time is expected to be. The residence time is typically about 20 seconds to about 120 seconds or longer, preferably from 30 seconds to 60 seconds, and more preferably about 40 seconds, to allow the pellets to crystallize to the desired degree and to allow the pellets to cool for handling. The larger pellets will retain more heat inside and crystallize more quickly than would be expected for smaller pellets. Conversely, the larger the pellet size, the longer the residence time required for the pellet to cool for handling purposes. The desired temperature of the pellet for final packaging is typically lower than would be required for further processing. It is generally observed that temperatures below the crystallization temperature, $T_{.sub.c}$, of the pellet is sufficient for additional processing while temperatures below the glass transition temperature, $T_{.sub.g}$, are appropriate for packaging. Values obtained by differential scanning calorimetry as measured in the cooling mode are good indicators of the temperatures as identified herein.

Figure 6:
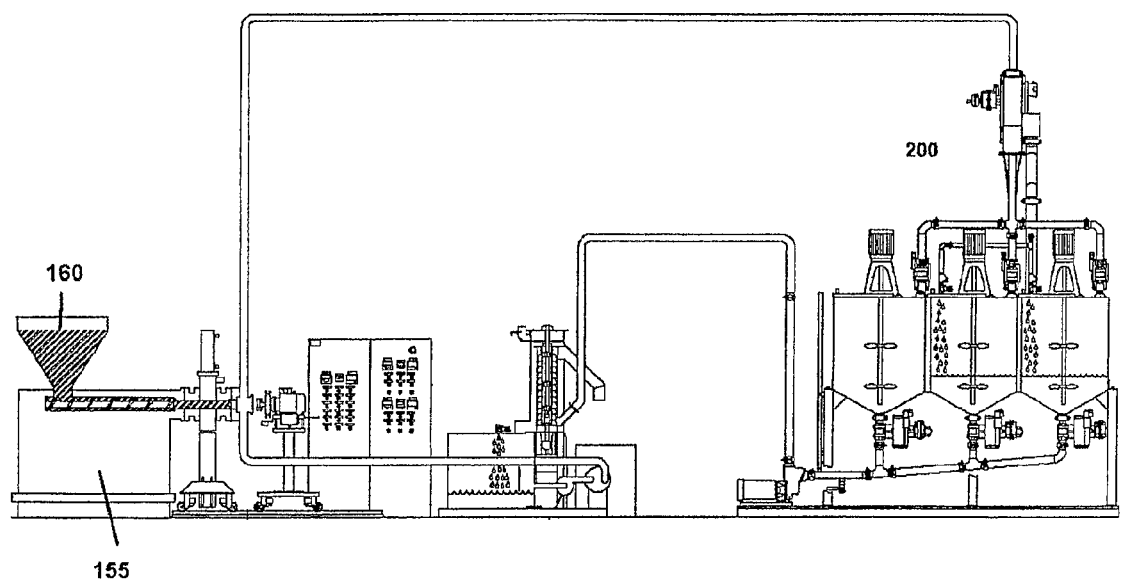
FIG. 6 is a schematic illustration showing an underwater pelletizing system including crystallization and dryer marketed and sold by Gala for use with thermoplastic polyurethane processing.
Figure 7:
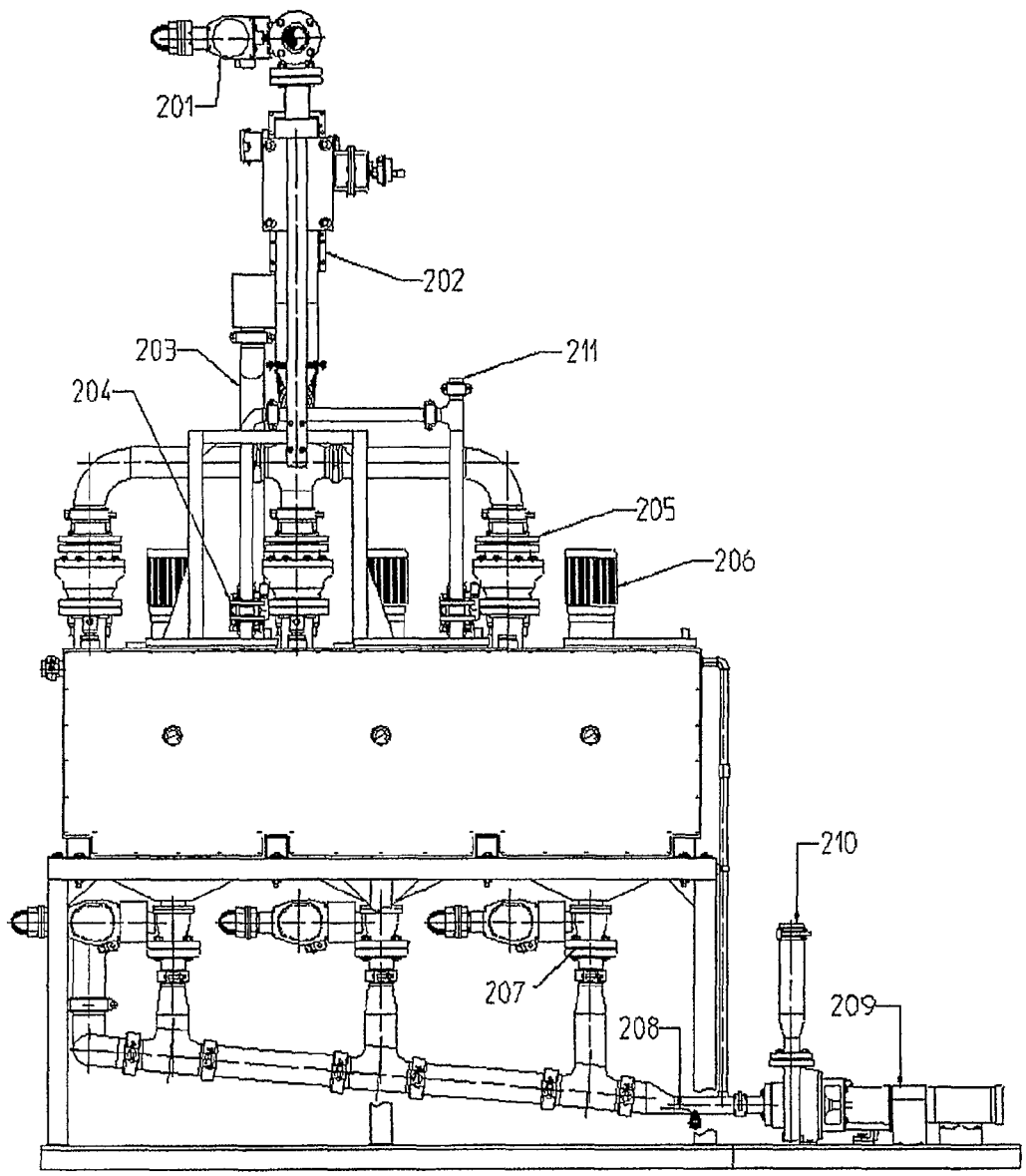
FIG. 7 is a schematic illustration of the crystallization portion of the system shown in FIG. 6.

Other methods of cooling or methods in addition to a vibrating conveyor can be used to allow the pellets exiting the dryer to have sufficient time to crystallize and subsequently cool for handling. For example, an alternative route for the current invention is the pellet crystallization system (PCS), marketed by Gala. The Gala PCS is illustrated in FIGS. 6 and 7. The Gala PCS provides additional crystallization and cooling by passing the pellet and water slurry through the inlet valve 201 into the agglomerate catcher 202 through the tank inlet valve 205 and into a tank fitted with an agitator represented as 206 in FIG. 7. After the initial water-fill through the water-fill valve 204 the pellet/water slurry is introduced alternately into the three separate tanks allowing additional time for the cooling and crystallization with agitation to prevent agglomeration of the pellets or granules. Details of the actual process are described in product literature and brief discussion is included here for purposes of illustration. The cooled pellet slurry exits the appropriate tank through the drain valve 207 and is transported through the transport pipe 210 via the process pump 209 to the dryer 32 through the dryer inlet 33 in FIG. 1 as detailed above.

As an alternative, the Gala PCS can be attached in sequence after the drier 108 or after the vibrating conveyor 84 allowing additional crystallization of the pellets to be achieved. As disclosed above, water including processing additives and cosolvents are contained within the scope of the process. The temperature of the water or water-containing solutions can be controlled in one, two, or all three tanks and may be the same or different in each of the tanks to confer greater crystallinity. As the degree of crystallization increases the crystallization temperature increases and the processing temperature can be increased to effect an even greater degree of crystallinity. As has been demonstrated historically, increased crystallinity confers improved properties on most polymers and conditions may be optimized according to the necessary gains in those desirable properties.

Pellets and granules from the dryer 108 or the vibrating conveyor 84 can be packaged or stored as required. They may also be transferred to solid state polycondensation or solid state polymerization, identified herein as "SSP" and has been detailed extensively in the prior art. Use of agitation with cocurrent or countercurrent flow of inert gas, preferably nitrogen gas, at elevated temperatures is a common component of the SSP process. This process requires enhanced crystallization as provided by the current invention to avoid agglomeration of the pellets and granules at the temperatures required for proper operation of the SSP process. The increased molecular weight which results from the SSP process allows clear, amorphous polymers to be obtained. Applications and uses are well-disclosed in prior art. It is beyond the scope of this application to describe the processing conditions for the various polymers contained herein as appropriate to SSP.

While the present invention has been described specifically with respect to numerous crystallizing polymers, other such crystallizing polymers, presently known or to be discovered in the future can be processed in accordance with the present invention. Accordingly, it is not intended that the present invention be limited to any particular crystallizing polymer or group of crystallizing polymers but the invention is intended to encompass all crystallizing polymers.

What is claimed is:

1. A method for processing crystallizing polymers into pellets using an apparatus including an underwater pelletizer and a dryer, said method comprising:
    extruding strands of a crystallizing polymer through a die plate for cutting in said underwater pelletizer;
    cutting the polymer strands into pellets in a cutting chamber of said pelletizer;
    transporting said pellets out of said cutting chamber through transportation piping to said dryer as a water and pellet slurry;
    injecting a high velocity gas into said transportation piping with said water and pellet slurry therein to generate a water vapor mist and enhance the speed of the pellets into and out of said dryer, said water vapor mist being formed by aspirating the water into vapor using said high velocity gas so as to separate the pellets from the water while the vapor travels with said pellets to said dryer, said high velocity gas being injected into said transportation piping at a point before water is removed from said slurry; and
    crystallizing said pellets exiting said dryer utilizing internal heat retained by said pellets.

2. The method as claimed in claim 1 wherein said pellets exiting said dryer are handled to avoid agglomeration.

3. The method as claimed in claim 2 wherein said pellets exiting said dryer are agitated to avoid agglomeration and to achieve a desired crystallinity from the retained internal heat.

4. The method as claimed in claim 1 wherein said pellets exit said dryer at a mean temperature above about 135° C.

5. The method as claimed in claim 1 wherein the crystallization of said pellets achieved without a secondary heating step is at least about 30%.

6. The method as claimed in claim 1 wherein said step of transporting said pellets out of said pelletizer to said dryer includes transporting said slurry upwardly at an angle from the vertical between 30° and 60°.

7. The method as claimed in claim 1 wherein said high velocity gas is air.

8. The method as claimed in claim 1 wherein said gas is injected substantially in alignment with a flow direction of said water and pellet slurry.

9. The method as claimed in claim 1 wherein said high velocity gas is injected at a flow rate of about 100 $m^3$/hour to about 175 $m^3$/hour.

10. The method as claimed in claim 1 wherein said vapor mist has a gas component of about 98% by volume.

11. The method of claim 1 wherein the gas injected into said slurry increases pellet flow speed so that the time taken from the pelletizer to an exit of said dryer is less than about one second.

12. The method of claim 1 wherein crystallization of said pellets occurs using only said internal heat retained from extrusion and in an absence of any secondary heating step while passing through said apparatus.

13. A method for processing crystallizing polymers into pellets, which comprises:
   extruding a crystallizing polymer into strands;
   cutting the extruded strands into pellets in a water stream;
   transporting said pellets in said water stream as a water and pellet slurry;
   injecting an inert gas at a flow rate of at least about 100 $m^3$/hour into said pellet and water slurry to separate the water from the pellets such that said pellets retain sufficient heat for crystallization of said polymer without the application of external heat, said high velocity gas being injected into said slurry before water has been removed from said slurry; and
   drying and agitating said pellets to achieve a desired crystallinity from the retained heat.

14. The method of claim 13 wherein said desired crystallinity is 30% or greater.

15. The method of claim 13 wherein the gas injected into said slurry aspirates the water into vapor and increases pellet flow speed from a pelletizer at said step of cutting to a dryer exit to a rate of less than about one second.

16. The method of claim 13 wherein said polymer is selected from the group consisting of polyesters and copolymers, polyamides and copolymers, polycarbonates and copolymers, and polyurethanes and copolymers.

17. A method for processing crystallizing polymers into crystallized pellets using an apparatus having an underwater pelletizer, a dryer and transportation piping therebetween, said method comprising:
   extruding and cutting strands of a crystallizing polymer into pellets in the underwater pelletizer using water;
   transporting said pellets and water out of said pelletizer and into said transportation piping as a water and pellet slurry;
   injecting a high velocity inert gas at a flow rate of about 100 $m^3$/hour to about 175 $m^3$/hour into said water and pellet slurry in said transportation piping before removing the water, said high velocity inert gas separating the water from the pellets while both remain within said transportation piping by aspirating the water; and
   transporting said aspirated water and pellets into said dryer located downstream of said gas introduction, said pellets exiting said dryer at a temperature of at least about 135° C. so that said pellets have sufficient internal heat retained from said extrusion to self-crystallize said pellets.

18. The method of claim 17 wherein the gas introduced into said slurry increases a speed of pellet flow so that the time taken from said pelletizer to an exit of said dryer is less than about one second.

19. The method of claim 17 wherein said step of introducing a high velocity gas includes injecting said gas at a pressure of about 8 bar.

20. The method of claim 17 wherein said injected gas produces a water vapor mist having a gas component of about 98% by volume.

21. The method of claim 17 wherein crystallization of said pellets occurs using only said internal heat retained from extrusion and in an absence of any secondary heating step while passing through said apparatus.

22. The method of claim 17 wherein said polymer is selected from the group consisting of polyesters and copolymers, polyamides and copolymers, polycarbonates and copolymers, and polyurethanes and copolymers.

23. The method as claimed in claim 17 wherein said pellets exiting said dryer are handled to avoid agglomeration.

24. The method as claimed in claim 23 wherein said pellets exiting said dryer are agitated to avoid agglomeration and to achieve a desired crystallinity from the retained internal heat.

* * * * *